Jan. 1, 1957 E. L. WOODCOCK 2,776,369
VIDEO INTEGRATOR CIRCUITS
Filed May 13, 1952 4 Sheets-Sheet 1

INVENTOR
EUGENE L. WOODCOCK
BY
ATTORNEY

Jan. 1, 1957  E. L. WOODCOCK  2,776,369
VIDEO INTEGRATOR CIRCUITS
Filed May 13, 1952  4 Sheets-Sheet 2

INVENTOR
EUGENE L. WOODCOCK
BY James P. Malone
ATTORNEY

Jan. 1, 1957  E. L. WOODCOCK  2,776,369
VIDEO INTEGRATOR CIRCUITS
Filed May 13, 1952  4 Sheets-Sheet 3

INVENTOR
EUGENE L. WOODCOCK
BY James P. Malone
ATTORNEY

INVENTOR
EUGENE L. WOODCOCK
BY James P. Malone
ATTORNEY

United States Patent Office 2,776,369
Patented Jan. 1, 1957

2,776,369

VIDEO INTEGRATOR CIRCUITS

Eugene L. Woodcock, Levittown, N. Y., assignor to Sperry Rand Corporation, a corporation of Delaware Application May 13, 1952, Serial No. 287,563

2 Claims. (Cl. 250—20)

This invention relates to pulse detection circuits and, more particularly, to gated video integrator circuits.

The present application relates to application Serial No. 287,473 for a gated video integrator radar system, filed May 13, 1952, in the name of Charles Brockner.

The above mentioned Brockner application pertains to a radar system for integrating signals received from various predetermined increments of range. That system uses a number of gated integrator circuits of the present invention which are properly synchronized with the radar system so as to filter the signals received from particular increments of range.

When a radar antenna is scanning, the signals from a particular target will be modulated in amplitude as the radar antenna scans past them. The basic frequency of this modulation is a function of the scanning speed and the beam width. Since this modulation frequency is known, filtering and integrating circuits may be made responsive to it and thereby discriminate against undesired signals, i. e., noise.

The present invention provides a gated video integrator comprising a switched bi-directional detector which is adapted to be switched on, momentarily, by a blocking oscillator, and filtering and integrating means responsive to the scan modulation frequency. The blocking oscillator is synchronized to produce pulses representing a particular range so that the detector will sample a predetermined increment of range. The detector output is then filtered and integrated in a network of special design to retain the fundamental modulation components of the target echo due to the scanning of the antenna and excluding a considerable portion of noise. The blocking oscillator is also connected to the output of the filter and provides a local pulse which is superimposed on the fundamental modulation to thereby create an essentially noise-free video.

The present invention is directed towards the particular circuits for detecting, integrating and filtering signals from a particular increment of range. A complete radar system of this type is disclosed in the above mentioned Brockner application. The present invention utilizes radar information which is not normally utilized in order to improve the signal-to-noise ratio. Special filter means called a step filter is provided. It is the equivalent of an L-section filter if the filtered output is made use of for only a particular instant of each voltage step. Such is the case in this application.

Accordingly, a principal object of the invention is to provide new and improved means for increasing the signal-to-noise ratio in a radar system.

Another object of the present invention is to provide new and improved pulse detection means.

Another object is to provide new and improved signal integration means for radar.

Another object of this invention is to provide new and improved video integrator means.

Another object of this invention is to provide new and improved step filter means.

These and other objects of the invention will be apparent from the following specification and drawings of which:

Figure 1:
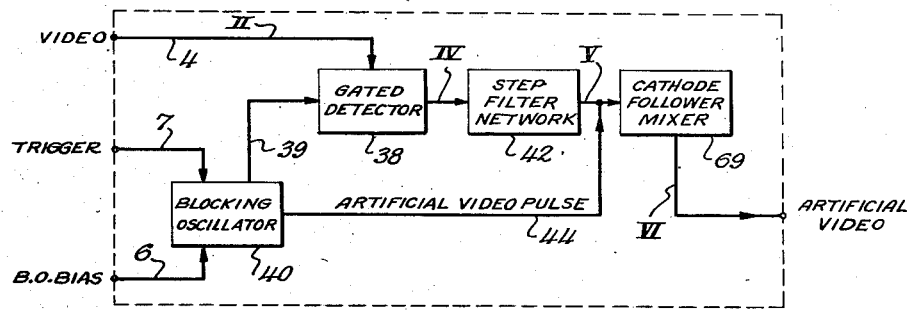
Fig. 1 is a block diagram of an embodiment of the invention.
Figure 2:
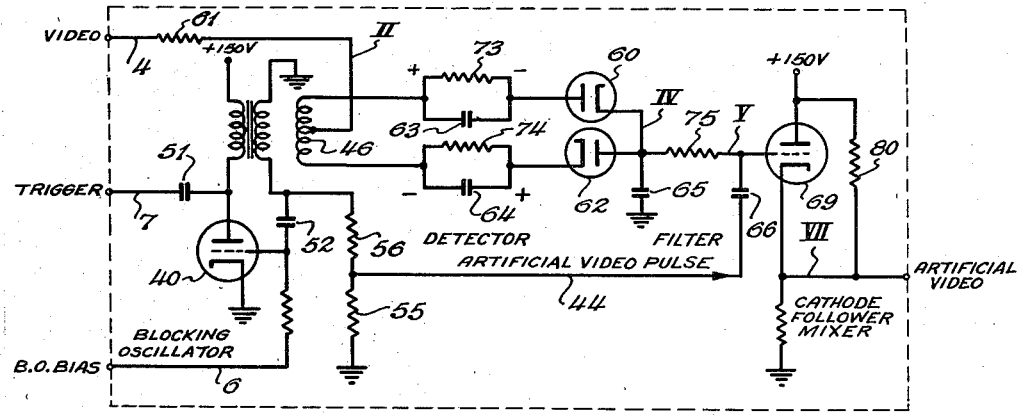
Fig. 2 is a schematic diagram of the embodiment of Fig. 1.

Figs. 1 and 2 show an embodiment of the gated video integrator of the present invention. It comprises generally a gated pulse detector 38 of the sampling type which stores the sampled voltage, a blocking oscillator 40 to gate the detector, network means 42 to filter and integrate the output and means 44 to reinsert an artificial video signal.

Operation of the individual integrator in detecting and filtering the video from its assigned range increment may be understood from the block and schematic diagrams of the integrator, Figs. 1 and 2. On the block diagram Fig. 1, the video on lead 4 is fed into a gated detector 38. This detector is preferably of the switched bi-directional bridge type. The detector is turned on for an increment of time approximately equal to the radar pulse width by the detector gate on lead 39 and will detect or sample the instantaneous value of the video on lead 4 during that time.

Figure 3:
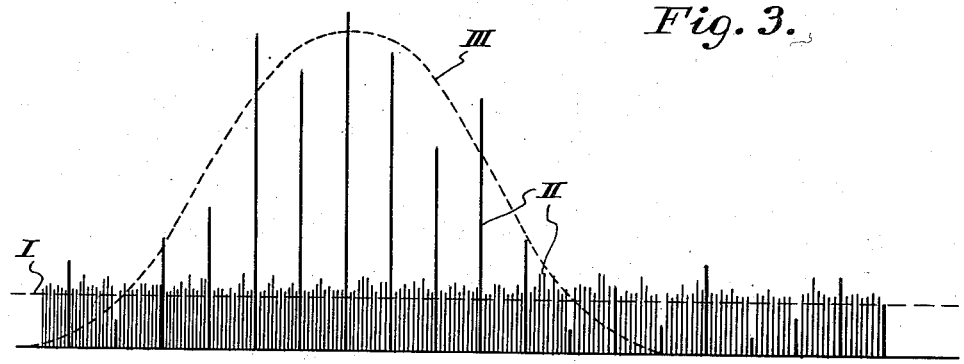
Figs. 3–5 are waveforms illustrative of the invention.
Figure 4:
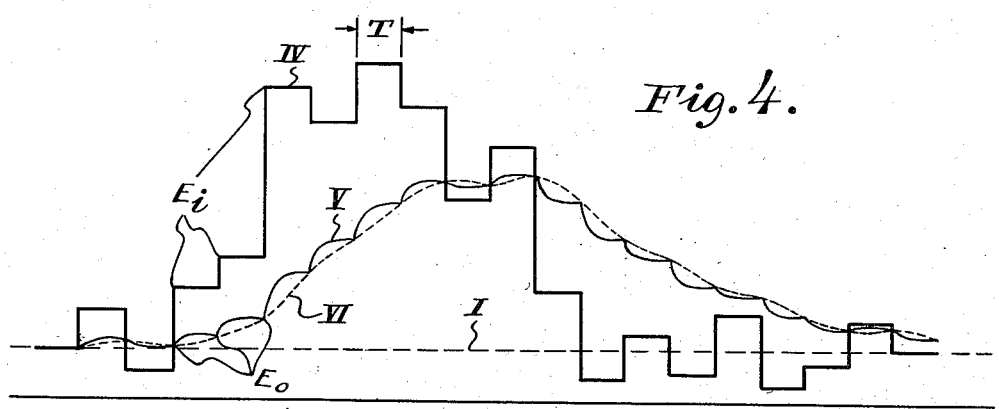

The video input II, i. e., signals plus noise on the lead 4 as the antenna scans a target, is shown in Fig. 3. The envelope III represents the average amplitude of the signals and level I the average value of noise. The output IV of detector 38 is shown in Fig. 4 as it would appear without loading. It corresponds to the peak output of the signals of Fig. 3. The output V of the filter integrator network 42 is also shown in Fig. 4, with the envelope VI at points on this output V for the times concurrent with operation of the blocking oscillator 40. The artificial video signal VII is shown superimposed on envelope VI in Fig. 5. The filter output V of Fig. 4 is stepped but its values at the moment of interest in each step have a smooth variation VI. The step filter will be fully discussed hereafter. The filter output V has a phase delay relative to the average signal envelope of Fig. 3.

The blocking oscillator 40 provides the necessary pulse gate voltage on lead 39 to the detector 38 when an initiating trigger on lead 7 arrives, causing it to fire. The blocking oscillator is normally cut off by a bias on lead 6. In a radar system the trigger on lead 7 is obtained from the transmitter through a delay line as discussed in the above mentioned Brockner application. In a scanning antenna radar system the amplitude of the video will vary as the antenna scans a target, as in Fig. 3.

The amplitude of the detected video from detector 38 will vary in steps IV, as in Fig. 4, each step occurring at the time the integrator is gated. The steps are equal in time to the pulse repetition interval. Detected noise appears at this point as steps of randomly varying amplitude occurring about some average voltage level I indicative of the noise level at the input. Detected signals plus noise Fig. 4 will have a similar appearance, but a higher average direct voltage level, due to repeated returns from the target which do not vary in random fashion.

The random portions of the detected video output from detector 38 are attenuated in a low pass step filter network 42. The filter network 42 output corresponds to a weighted average of the video signals in the time period immediately past corresponding to time required to scan approximately a beam width. This low pass band filter greatly attenuates the rapid, random fluctuations due to detected noise, but does not seriously reduce the slower variations in level due to detection of a group of repeated signals such as returns from a target passing through the radar beam. The resultant slowly varying filter 42 output V, Fig. 4, acts as a base potential for the grid of the cathode follower 69. The filter output is stepped but has a smooth variation VI for particular instants of each step.

Figure 5:
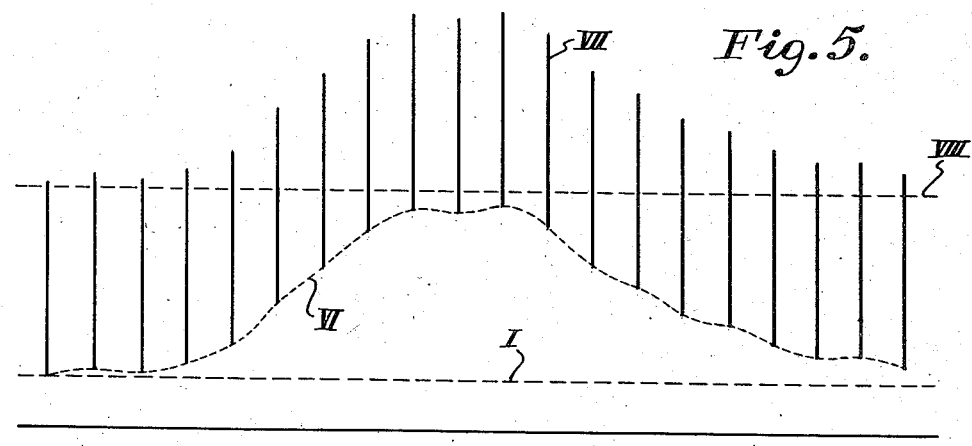

Superimposed on the filter 42 output VI are positive pulses VII from the blocking oscillator, namely, the artificial video pulses on lead 44 as shown in Fig. 5. Essentially, the artificial video on lead 44 is being modulated at the grid of the cathode follower 69 by the slowly varying filter 42 output. The cathode follower 69 Fig. 2, is biased at a level VIII, Fig. 5, by positive cathode return through resistor 80, such that only those artificial video pulses occurring when the filter 42 output V has a level above the average noise level I can cause the cathode follower to conduct. The cut-off bias level VIII, Fig. 5, must be greater than the maximum possible filter 42 output V, Fig. 4, so this output V along will never cause conduction of the cathode follower 69. The portion of the artificial video on lead 44 which exceeds the cathode follower 69 cut-off bias level VIII appears on the cathode follower 69 output as the artificial video signal.

The schematic diagram, Fig. 2, shows a typical integrator circuit. The blocking oscillator tube 40 is plate triggered through condenser 51 by a negative trigger on lead 7. Positive feedback to the grid is accomplished through condenser 52. The artificial video pulses on lead 44 are taken from a voltage divider composed of resistors 55 and 56 across the grid winding of the blocking oscillator. The detector gate is magnetically coupled into a tertiary winding 46 on the blocking oscillator transformer.

The integrator video on lead 4 is coupled through isolating resistor 61 to the center tap of the blocking oscillator transformer tertiary 46 in the gated detector. When the detector gate occurs, a positive voltage is induced on the upper end of the tertiary winding 46 and an equal and opposite negative voltage is induced on the opposite end. This permits both detector diodes 60 and 62 to conduct, placing a low impedance charge path for the video between condenser 65 and the integrator video signal input 4. The time constants are such that condenser 65 will almost completely charge to the video voltage during the sampling gate. Current flowing through the diodes due to the voltage induced between the end of the transformer tertiary 46 will charge condensers 63 and 64. At the end of the gate, condenser 64 will discharge through resistor 74 and condenser 63 through resistor 73. The discharge currents through resistors 73 and 74 will create bias potentials of the polarity shown, keeping the diodes cut off until the next detector gate on lead 38 is generated.

The $\pi$ section filter network 42 is composed of condensers 65 and 66 and resistor 75. Capacitor 65 serves a double function as the load impedance to the gated detector, and input capacitor to the filter. Since condenser 65 is not isolated from resistor 75 and condenser 66, it is free to discharge through resistor 75 into condenser 66 in the pulse repetition interval. When the stepped output V, Fig. 4, from the filter is of interest only at the time the detector gate occurs, as is the case in this application, the filter may be designed to have integrating action equivalent to that of an isolated L-section filter. It has the advantage of being less subject to changes due to temperature, since the filtering action can be made almost solely dependent on the ratio of the values of condensers 65 and 66, as will be more fully discussed later.

The artificial video on lead 44 is coupled to the grid of the cathode follower mixer 69 through capacitor 66, which serves a double function as the output filter capacitor. The source impedance of the artificial video is low enough so that integrating action of the filter is not disturbed.

A radar system using integrators of the above type is disclosed and claimed in copending application Serial No. 287,473, filed May 13, 1952, entitled "Gated Video Integrator System," in the name of C. Brockner. Such a gated video system, using integrators of the present invention, provides means for splitting a specified segment of range into small increments or channels, means for detecting and filtering the video signal from each increment in its own individual detector-integrator, means for generating in each integrator an artificial video signal which is proportional to the filtered video gated to that unit, and finally means for combining the artificial video outputs from the several integrators to form an artificial video signal for the segment of range thus processed. By suitable design of detector and filter in the individual integrators, it is possible to reduce the output due to random noise to a very low level, while the integrated output due to a received target, which will be repetitous for a certain interval, is only slightly reduced.

In a particular radar application it might be desirable to integrate a segment of range 5000 to 8000 yards long, with each increment being about 200 yards in length. The lengths of the range segment and the short increments will depend on the tactical use of the radar and its pulse length. Allowing for some overlap of the increments, from 30 to 50 separate integrators should suffice for this application.

The gated video integrator system may be inserted in any radar system video lead between the radar receiver and the radar indicator or some automatic detection device. Inputs will consist of the video from the radar receiver (which would normally go to the indicator), a range signal to determine the start of the segment of range to be integrated (this can and should be variable in range), and finally a supply of primary power. The output will be a mixed video signal composed of the artificial or integrated video for a given segment of range, and normal video for the remainder of the range. The artificial video segment is then adjustable at will to any portion of the range sweep.

*Step filter network*

There are many instances in the application of bi-directional or phase-sensitive demodulators when the output is: (a) filtered to eliminate unwanted high frequencies due to noise, harmonics, transients, etc., and (b) of interest only at moments of time occurring at intervals of time T, such as the period of the repetition frequency, peaks of a carrier wave, etc. When these conditions apply, a simple $\pi$-type RC network, as in Fig. 2, may be used at the output of the demodulator to give step filtering action equivalent to that of an isolated RC integrating network. The component values of the step filter are much smaller than for an L-type RC integrator and in many cases the filtering action can be made less sensitive to changes in component values.

Figure 6:
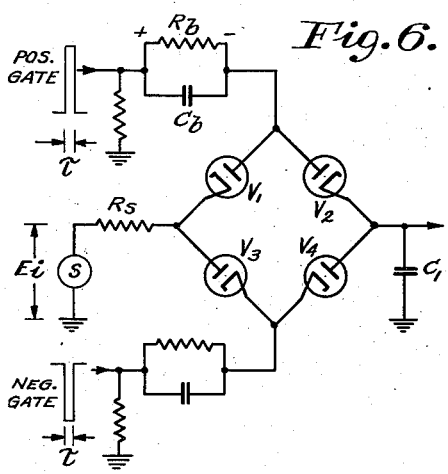
Fig. 6 is a schematic diagram of a gated detector.

Fig. 6 is a typical example of a gated phase-sensitive detector of the type in Fig. 2, also known as a "staircase" detector from the step-like waveform of the output.

There are three main assumptions applying to a demodulator of this type: (1) the duration of the gate, $\tau$, is very much shorter than the time interval between gates, T; (2) the charge time of $C_1$ through the source impedance $R_s$ is short compared to the gate time $\tau$ permitting $C_1$ to become fully charged during $\tau$; and (3) the source voltage $E_i$ is constant during $\tau$.

Briefly, the operation of a gated demodulator is as follows; the output capacitor $C_1$ of the demodulator is charged to the value of the input signal voltage $E_i$ during the time $\tau$ that the two gates are applied. The four diodes $V_1$, $V_2$, $V_3$, $V_4$ are normally biased beyond cut-off by any of a number of methods. In Fig. 6 we are employing a type of self-bias similar to the "grid leak" type used on many amplifiers. The only requirements for this type of biasing are that the capacitor $C_b$ be large so that little of the gating pulse voltage is dropped across it and that the $R_bC_b$ product be large compared to the discharge interval T, so the capacitor will not have discharged a significant amount before the next gate arrives.

When the gates are applied to the demodulator, causing the diodes to conduct, a low impedance circuit exists between the input voltage $E_i$ and the output capacitor $C_1$, permitting $C_1$ to charge rapidly to the value of $E_i$. At the end of the gate time $\tau$, the diodes revert to the cut-off condition, and the circuit between $E_i$ and $C_1$ is opened. Capacitor $C_1$ will normally retain its charge during time T, since it usually operates into a high impedance, such as the grid of a tube.

Therefore, the diode bridge acts as a switch which makes a momentary low impedance contact between $C_1$ and some signal source S having a voltage output of $E_i$ at that moment.

Figure 7:
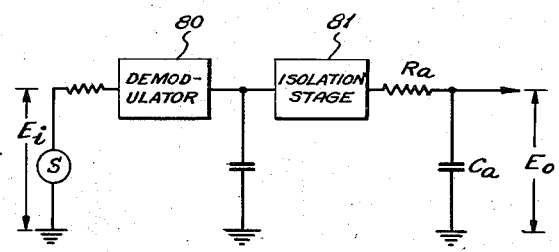
Figs. 7–9 are circuit diagrams illustrative of the operation of the step filter.

Referring to Fig. 7, in conventional practice, any necessary filtering of the output from the demodulator 80 is done after a stage of isolation 81 (amplifier or cathode follower) has been inserted to prevent loading of the demodulator output. It is also possible to omit the isolating stage by choosing proper values of components. The range of values is restricted in this latter case, and generally involves high values of resistance. For simple RC integration, for instance, this will mean making $C_1$ much larger than $C_2$ in Fig. 8. In pulse work the value of $C_1$ will normally be restricted to values less than .01 microfarad in order that it be completely charged during the gate time. This limits the maximum size of $C_2$ to a small value, which in turn requires prohibitively large values of R when considerable filtering is required.

An equivalent type of filtering called step filtering is set forth in the present invention in which the values of R and $C_2$ are so chosen that $C_1$ is intentionally loaded, and will discharge in the interval T between gates, $C_1$ sharing its charge with $C_2$. This provides a stepped output but this is allowable in the present application since we are only interested in particular instants.

The filtered output from a switched demodulator is basically a transient phenomenon, involving the behavior of a network during interval T when a voltage $E_i - E_0$ is applied, where $E_i$ is the instantaneous value of the signal source at time of switching and $E_0$ is the potential at the output of the filter at the same time. The following discussion will prove the equivalence, at time $t=T$, between the value of the output voltage from an isolated $R_aC_a$ integrator as in Fig. 7, and the output voltage from the step filter of Fig. 8.

*Derivation of the step filter equations*

Figure 8:
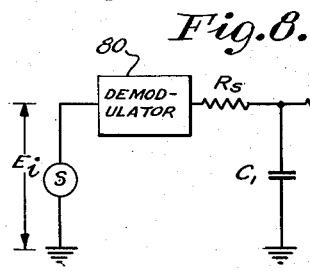

The filter action in this instance is similar to what would be obtained by switching the capacitor $C_1$, Fig. 8, to the generator S, charging it up very rapidly to $E_i$, and then switching it back to discharge into $C_2$. The following conditions apply:

R is much greater than $R_s$;
$R_sC_1$ is less than $\tau$;
$\tau$ is much less than T Initially, at $t=0$ (the instant at the end of $\tau$ and the start of period T when $C_1$ starts discharging into $C_2$):

$$e_1 = E_i$$

where $e_1$ is the instantaneous voltage across $C_1$.

$$e_2 = E_0$$

where $e_2$ is the instantaneous voltage across $C_2$.
Steady state, at $t = \infty$:

$$e_1 = e_2 = E_s$$

where $$E_s = \frac{E_iC_1 - E_0C_2}{C_1 + C_2} \quad (1)$$

Equation (1) is derived from the expression for conservation of charge.

The transient current is:

$$i = \frac{E_i - E_0}{R} \epsilon^{-\frac{t}{RC_t}}$$

where $$C_t = \frac{C_1C_2}{C_1 + C_2} \quad (2)$$

The value of $e_1$, the instantaneous voltage across $C_1$ is then $$e_1 = E_i(E_i - E_0)\left(\frac{C_t}{C_1}\right)\left(1 - \epsilon^{-\frac{t}{RC_t}}\right) \quad (3)$$

In similar fashion to the above, we can see that the instantaneous voltage $e_2$ across $C_2$ is $e_2 = E_0 + e_{c_2}$ where $e_{c_2}$ is the voltage due to charge of $C_2$ by electrons from $C_1$. Therefore, $$e_2 = E_0 + (E_i - E_0)\left(\frac{C_t}{C_2}\right)\left(1 - \epsilon^{-\frac{t}{RC_t}}\right) \quad (4)$$

Waveform V, Fig. 4, illustrates $e_2$ showing the stepped output.
Since $$\frac{C_t}{C_2}$$

is constant, at the end of any given period of time $t=T$ we have $$\left(\frac{C_t}{C_2}\right)\left(1 - \epsilon^{-\frac{T}{RC_t}}\right) = k \quad (5)$$

where $k$ is a constant of value equal to or less than unity and is a measure of the filtering or integrating action to be expected of this $\pi$-network. We call $k$ the coefficient of filtering.

*Equivalence of step and L-filters*

Figure 9:
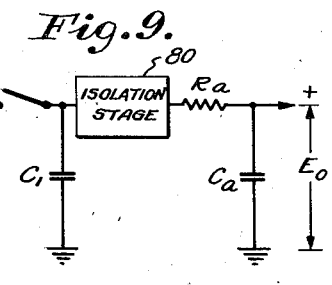

Assuming isolation between the output of the detector and a simple $R_aC_a$ integrator, we have in effect, a circuit whose action is similar to that shown in Fig. 9. $C_1$ is fully charged when the switch is closed for time $\tau$ (demodulator gated) and the isolation prevents its discharge when it is again opened. $C_a$ will now begin to charge through $R_a$ to $E_i$, the potential across $C_1$. If the isolation is in the form of a cathode follower, the isolation output impedance can be neglected in comparison to $R_a$.

The well known expression for the instantaneous value of voltage across a charging capacitor is:

$$e_a = E_i\left(1 - \epsilon^{-\frac{t}{R_aC_a}}\right) + E_0\epsilon^{-\frac{t}{R_aC_a}} \quad (6)$$

By adding and subtracting $E_0$ on the right-hand side, we do not change the value of $e_a$, but obtain $$e_a = E_0 + (E_i - E_0)\left(1 - \epsilon^{-\frac{t}{R_aC_a}}\right) \quad (7)$$

Comparison of Equation 4 with Equation 7 indicates that $e_a = e_2$ at time $t = T$ if we make $$\left(1 - \epsilon^{-\frac{T}{R_aC_a}}\right) = \left(\frac{C_t}{C_2}\right)\left(1 - \epsilon^{-\frac{T}{RC_t}}\right) = k$$

To simplify the writing of this equation, let $$\frac{T}{R_aC_a} = \eta \quad (8)$$

$$\frac{C_t}{C_2} = \frac{C_1}{C_1 + C_2} = \alpha \quad (9)$$

and $$\frac{T}{RC_t} = \beta \qquad (10)$$

We now have $$(1 - \epsilon^{-\eta}) = \alpha(1 - \epsilon^{-\beta}) = k \qquad (11)$$

It should be noted that the ratio of $C_1$ to $C_2$ is specified by $\alpha$, since $$\alpha = \frac{C_t}{C_2} = \frac{C_1}{C_1 + C_2}$$

$$C_2 = C_1 \frac{(1-\alpha)}{\alpha} \qquad (12)$$

Although $e_a$ normally is not equal to $e_2$, it can be made so at any time $t = T$ by choosing correct values for $\beta$ or $\eta$. Since the bridge type detector is normally gated at some frequency, $f$, we have $$T = \frac{1}{f}$$

Equation 11 says that the two circuits will have equal outputs at the end of the period T, if corresponding values of $E_i$ and $E_0$ were equal at the start of that period.

When a step voltage is applied to an $R_aC_a$ network, the capacitor will start to charge exponentially to the value $E = (E_i - E_0)$ impressed. (See Fig. 10.) At the time $t = T$, its voltage $e_a$ will be some value $e_T = kE$ where $k$ is the same as defined in Equation 11. We may also have a voltage A arrive at the same value $e_T$ by any of a number of various other routes, as shown in Fig. 11.

Since the route taken by A in reaching this desired value $e_T$ is not defined when $k$ and T are specified, the designer is free to vary a number of parameters to control this route. The useful value to specify will usually be the time constant $RC_t$ as determined by $$\beta = \frac{T}{RC_t}$$

The value of $\alpha$ could also be chosen.

If we choose to specify $\alpha$, we have defined the voltage $E_s$ (Equation 1) which $C_2$ was charging toward. This voltage and the point $e_T$ through which it must pass being determined, the value $RC_t$ is defined, since only one RC charge path to a given voltage can pass through this point.

It should be noted that if the voltage to which $C_2$ is charging ($E_s$) is nearly equal to the value $kE$, then the value of $RC_t$ will be small with respect to T. Any value of $$RC_t < \frac{T}{10}$$

will pass sufficiently close to point ($k$, T). In this case, no serious restriction is placed on $RC_t$ by specifying $\alpha$.

Little restriction is placed on actual values of components when $RC_t$ is defined since only the $RC_t$ product and ratio of $C_1$ to $C_2$ is now fixed. A value must be picked for one of the three components to determine the other two.

If $\beta$ is chosen instead of $\alpha$, we are specifying the rise time of the output as $C_2$ charges to some voltage E. The required value of $E_s$ is also determined. If we chose a value of $\beta \geq 7$ or 8, we find from Equation 11 that $$k = \alpha(1 - \epsilon^{-\beta})$$

reduces to $$k = \alpha \qquad (13)$$

Figure 10:
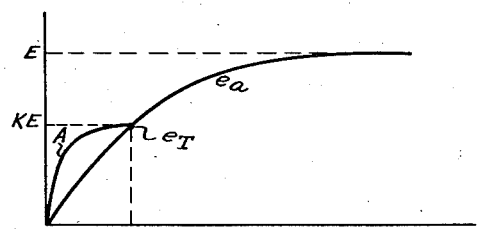
Figure 11:
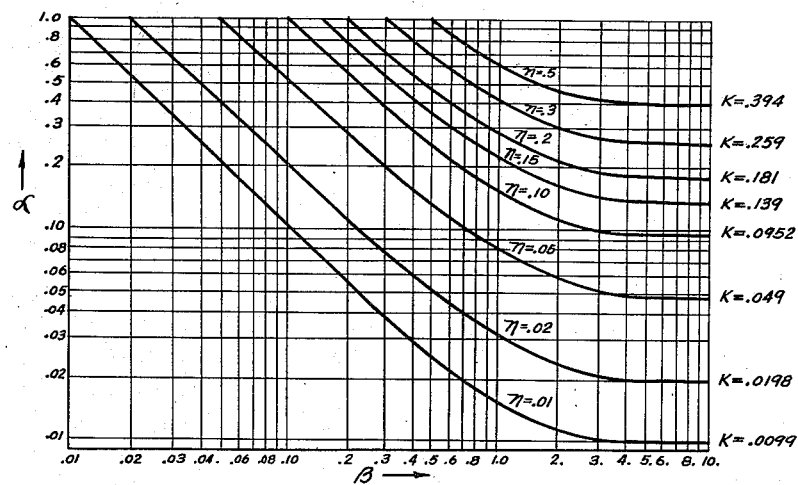

This is a case which will frequently be used, and is illustrated by route A in Fig. 10.

Since for any constant interval T between two gates, outputs of the two filters arrive at the same point at the time $t = T$, even though by very different routes, an envelope formed by a succession of such points will be the same whether a $\pi$-section or an L-section filter is used as shown in Fig. 5. If such an envelope exhibits a phase shift from that of the input signal source to the demodulator, the phase shift will be the same for each type of filter. In short, when we are interested in the filtered output only at discrete points spaced T apart, the step filter is the equivalent of the L-section amplitude, frequency and phase-wise.

When a step filter of this type is used, it is commonly desirable to be able to express its frequency and phase characteristics in terms of the characteristics of a simple RC integrator. It will usually be the case that the desired characteristics are defined in terms of this simple RC, and the step filter will be designed to comply with them.

Fig. 11 is a graphical presentation of the relation between $\alpha$ and $\beta$ for a number of values of $\eta$. The filtering action of an L-section filter is specified by its value of $\eta$. The family of constant $\eta$ curves represents the variation of the required $\alpha$ with $\beta$ for step filters equivalent to the given L-section.

Several interesting things may be noted from the curves. First of all, when the value of $\beta$ is larger than seven or eight, the value of $\alpha$ becomes constant, and equal to $k$, Equation 13. In other words, if $RC_t$ is small enough with respect to T, the response of the network at time $t = T$ is determined almost solely by the value of $\alpha$, which in turn is determined by the ratio of $C_1$ to $C_2$. This represents the case where $C_1$ will discharge very quickly into $C_2$, reaching the equilibrium point where the voltage across each is $E_s$ long before the end of interval T. The filtering or integrating action is dependent almost entirely on the ratio of $C_1$ to $C_2$ when $\beta$ is large. Figs. 3, 4 and 5 illustrate the filtering action that can be obtained with a filter having $\beta = 8$ and $\alpha = k = 0.20$. The fact that $k = .20$ means the step filter 42 output V, Fig. 4, will change in the interval T by the amount 0.20 ($E_i - E_0$), where $E_i$ is the peak value of video input II, Fig. 3, impressed during the time switching occurs at the start of interval T, and $E_0$ is the potential of filter output V at the same time, as previously defined.

One of the greatest advantages of this $\pi$-network is its ability to do equivalent filtering with smaller valued components than its $R_aC_a$ counterpart. It is natural to seek an "improvement factor," which is here called $\delta$, where $$\delta = \frac{R_aC_a}{RC_2} \qquad (14)$$

Since $$\eta = \frac{T}{R_aC_a}, \beta = \frac{T}{RC_t} \text{ and } \alpha = \frac{C_t}{C_2}$$

we have $$\delta = \frac{\alpha\beta}{\eta}$$

Figure 12:
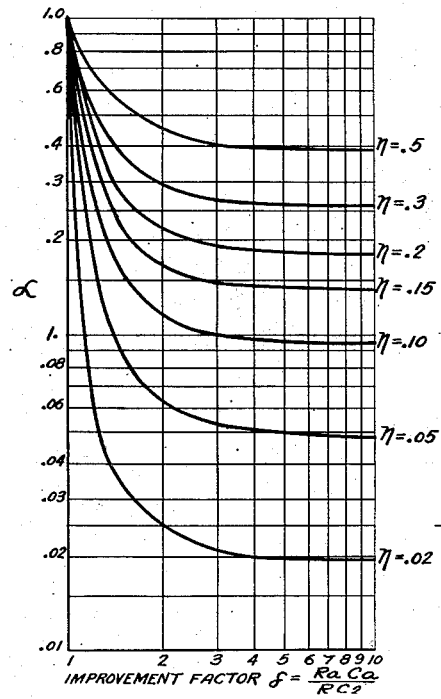
Figs. 10–13 are graphs illustrative of the operation of the step filter.

Fig. 12 is a plot of a family of $\alpha$ vs. $\delta$ curves for several values of $\eta$. To get the greatest improvement (i. e. largest $\beta$ or smallest $RC_2$), it is necessary to select the value of $\alpha$ which is approached most closely by the constant $\eta$ curve.

Normally we want the improvement factor to be as large as possible. When it is equal to unity, the two types of filter have essentially the same outputs ($e_2 = e_a$) at every instant, since the charge path followed by $e_2$ in this case becomes the same as that taken by $e_a$. A small value of $\alpha$ is desirable, therefore, although it can never be reduced below the value of $k$ (see Equation 13).

The most useful case from the point of view of improvement by reducing the size of the components, can be achieved when $\beta$ (and consequently $\delta$) is very large (i. e. $\alpha = k$). When this is true, the envelope of $e_2$ will have a sharper, stepped appearance. If we are interested only in the value of $e_2$ at the time the gating occurs, as was previously assumed, this stepped shape of the output is of little consequence. When a smoother output is required, some sacrifice in $\delta$ must be made, or more filtering must be done in successive stages to eliminate the steps.

Figure 13:
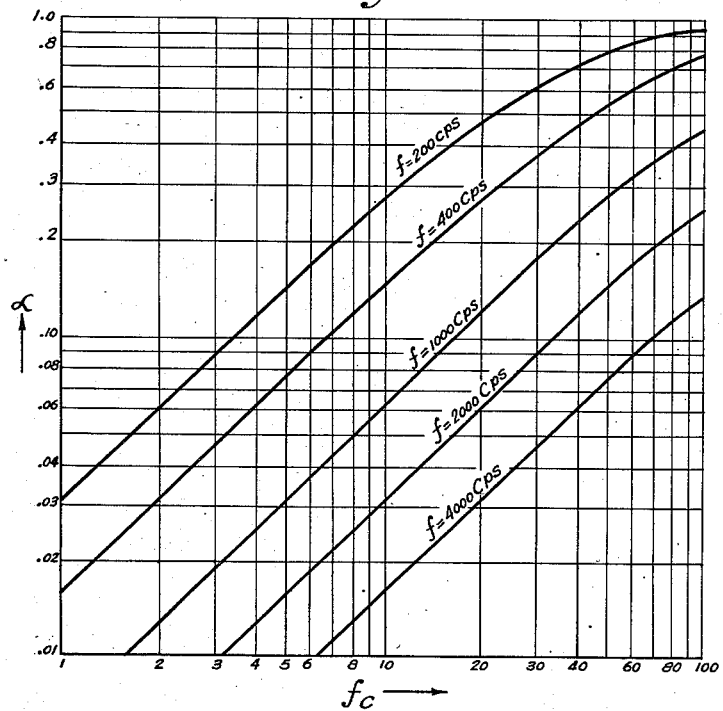

Fig. 13 is a graph showing the variation of cut-off frequency $f_c$ with the value of $\alpha$ for a number of different repetition rates, $f$. It is assumed here that $\beta$ is larger than $\delta$. When this is true, we obtain $$\alpha = \left(1 - \epsilon^{\frac{-2\pi f_c}{f}}\right)$$

where $$f = \frac{1}{T}$$

This relationship is solved and plotted for a number of values of $f$ in Fig. 14.

In designing a $\pi$-section to match a given L-section filter, we proceed as follows:

(a) Determine $\eta$ for the L-section from the period T and time constant $R_a C_a$ (Equation 8).

(b) Determine $\alpha$ for the $\pi$-section from Equation 11 or Fig. 12. Usually $\beta$ will be chosen equal to eight or ten, so that $\alpha = k$, since this gives greatest improvement.

(c) Choose a convenient value of $C_1$ that will meet the requirement that $\tau > R_s C_1$. Using this and value of $\alpha$ found above, determine $C_2$ from Equation 12.

(d) Determine R from Equation 10.

It will be noted from the derivation of Equation 13 that $\beta$ may be greater than 10 and have no measurable effect on the frequency response characteristic at time $t = T$; i. e., the value of $k$ is unaffected. This means that $$R \leq \frac{T}{10C_t} \quad (15)$$

The minimum limit for R is the case where R is no longer much greater than $R_s$, the source impedance of the demodulator. Equation 15 means that the value of R is not critical, i. e., its value may range in many cases, from a few thousand ohms to several megohms. Changes in value due to temperature, etc., will not affect the filtering. In the straight $R_a C_a$ integrator we have no choice in the value of the resistor, and any change in value will be reflected in the output response.

As long as $\beta$ is larger than 10, we may vary $C_t$ as well as R, within the limits of Equation 15. In the practical case, this will occur as the values of $C_1$ and $C_2$ change with temperature. Referring to Equations 11 and 13 we see again that $k$ is proportional to $\alpha$ where $\beta \geq 10$ and we must therefore keep $\alpha$ constant to maintain the same filtering characteristics. From Equation 9 we see that $\alpha$ will be constant if both $C_1$ and $C_2$ vary by the same percent. The only change in $\alpha$ that can occur will be due to differences in the temperature coefficients of the two, and not on the absolute value of that coefficient.

For capacitors of the same type and made from the same materials, this difference in temperature coefficient should be much smaller than the coefficient itself, and the total variation in $\alpha$ will be smaller than the variation in absolute value of $C_1$ or $C_2$.

In the L-section circuit, the filtering action varies directly with $R_a$ and $C_a$, and any change in the value of one must be compensated for by an inverse change in the other; i. e., the product $R_a C_a$ must be constant. In the practical case, this is not easy to do. If severe changes in the repetition interval are to be experienced, the two types of filter are no longer equivalent, since the Equation 11 no longer holds for the new value of T.

Therefore, in the frequent case when the output from a gated or switched demodulator is of interest only at the end of discrete intervals of time T corresponding to the period of the gating frequency, a simple $\pi$-section network can be used directly on the output of the demodulator to accomplish step filtering. In this case, the stepped appearance of the filtered output is of little consequence. By designing the filter to have quite sharp steps (large values of $\beta$) several distinct advantages are gained:

(a) Smaller valued components can be used than are needed in the equivalent isolated L-section for the same filtering action.

(b) The value of the series R is not critical over broad limits, so that tolerances, temperature coefficients etc. can be disregarded as a source of design difficulty.

(c) The filtering action will depend almost entirely on the ratio of input to output capacity, and will not be affected if each of these values change (due to temperature, etc.) by the same percent. This $\pi$-section filter can be designed to have the same amplitude, frequency and phase characteristics as an isolated L-section filter, providing T is nearly constant.

The use of the present filter renders the circuit less susceptible to changes; i. e., the capacitors are likely to change in the same direction; the circuit works equally well with from 0.3 to 3.0 megohm resistors.

The connection from the blocking oscillator to the output filter capacitor performs two functions—(a) the capacitor is practically at ground potential because the blocking oscillator resistor to ground is comparatively small, and (b) capacitor couples blocking oscillator pulse into grid of cathode follower.

The present circuit differs basically from an L type RC filter-integrator because in the latter, the time constant must be changed if the repetition frequency is changed. In this circuit, the number of hits per target must remain the same but the repetition frequency may be changed over fairly wide limits without changing the circuit constants. This may more readily lend itself to anti-jamming techniques.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A video integrator circuit comprising in combination a gated detector means, said detector means including a first input circuit for receiving applied video pulse signals, an output circuit for supplying gated output pulse signals, diode tube means connected between said input circuit and said output circuit, and second input circuit means coupled to said diode tube means, pulse generator means producing recurrent short pulses of energy coupled to said second input circuit, said short pulses of energy momentarily energizing said diode tube means for providing a low impedance path between said first input circuit and said output circuit throughout the duration of said short pulses, said diode tube means providing a high impedance path between said first input circuit and said output circuit in the time interval between pulses, said gated detector means passing to said output circuit applied video pulse signals occurring simultaneously with said recurrent short pulses of energy, low-pass filter means coupled to said output circuit for integrating said gated output video pulse signals, selective means coupled to the output of said filter means, and means coupling the recurrent short pulses of energy from the output of said pulse generator means to said selective means, said selective means being jointly responsive to the output of said filter means and said pulse generator means for producing output pulses representing applied video pulse signals.

2. A video integrator circuit comprising in combination a gated detector means; said detector means including an input terminal, an output terminal, and a common ground terminal, means for applying video pulse signals between said input terminal and said common terminal, first condenser means coupled between said output terminal and said common ground terminal, diode tube means connected in series between said input terminal and said output terminal, and an input circuit means coupled to said diode tube means; pulse generator means producing recurrent short pulses of energy coupled to said input circuit, said short pulses of energy rendering said diode tube means conductive for providing a low impedance path between said input terminal and said output terminal throughout the duration of said short pulses, said diode tube means being non-conductive in the time interval between pulses for providing a high impedance path between said input terminal and said output terminal; said first condenser means receiving a charge proportional to the peak value of applied video pulses occurring simultaneously with said recurrent short pulses of energy; resistor means having one end connected to said output terminal; second condenser means coupled between the output of said pulse generator means and the other end of said resistor means; and selective means coupled between the junction of said resistor and second condenser means and said common ground terminal, said selective means being jointly responsive to the recurrent short pulses of energy from the output of said pulse generator means and the output coupled through said resistor means.

References Cited in the file of this patent

UNITED STATES PATENTS

| | | |
|---|---|---|
| 2,448,027 | Grieg | Aug. 31, 1948 |
| 2,519,359 | Dean | Aug. 22, 1950 |
| 2,562,309 | Frederick et al. | July 31, 1951 |